(12) United States Patent
Fluhrer

(10) Patent No.: US 8,506,131 B2
(45) Date of Patent: Aug. 13, 2013

(54) DISPLAY DEVICE COMPRISING A THREE-DIMENSIONAL LIGHT DISTRIBUTING BODY

(75) Inventor: Henry Fluhrer, Bretten (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 434 days.

(21) Appl. No.: 12/790,129

(22) Filed: May 28, 2010

(65) Prior Publication Data

US 2010/0309668 A1    Dec. 9, 2010

(30) Foreign Application Priority Data

Jun. 3, 2009    (DE) .......................... 10 2009 024 642

(51) Int. Cl.
*F21V 3/00*    (2006.01)
*F21V 5/00*    (2006.01)

(52) U.S. Cl.
USPC ...... 362/311.06; 362/290; 362/291; 362/292; 362/311.01; 362/317; 362/362; 362/361; 362/335

(58) Field of Classification Search
USPC .............. 362/255–256, 279–281, 290–292, 362/311.01–311.15, 317, 326–340, 351, 362/355, 360–361
See application file for complete search history.

(56) References Cited

U.S. PATENT DOCUMENTS

| | | | |
|---|---|---|---|
| 3,780,357 A | 12/1973 | Haitz | |
| 6,961,190 B1 | 11/2005 | Tamaoki et al. | |
| 7,300,183 B2 | 11/2007 | Kiyomoto et al. | |
| 7,514,723 B2 | 4/2009 | Arndt et al. | |
| 7,645,058 B2 * | 1/2010 | Kurokawa et al. | 362/339 |
| 7,988,340 B2 * | 8/2011 | Kuo | 362/331 |
| 8,007,160 B2 * | 8/2011 | Kim | 362/621 |
| 8,023,068 B2 * | 9/2011 | Joo et al. | 349/64 |
| 2005/0212089 A1 * | 9/2005 | Kiyomoto et al. | 257/601 |
| 2006/0119542 A1 | 6/2006 | Ho | |
| 2008/0316603 A1 * | 12/2008 | Jang et al. | 359/599 |
| 2011/0299270 A1 * | 12/2011 | Kojima et al. | 362/97.1 |
| 2012/0126261 A1 * | 5/2012 | Shimizu | 257/88 |

FOREIGN PATENT DOCUMENTS

| | | |
|---|---|---|
| DE | 43 11 937 A1 | 10/1994 |
| DE | 94 17 326.5 | 2/1995 |
| DE | 203 14 391 U1 | 1/2004 |
| DE | 102 39 090 A1 | 3/2004 |
| WO | WO 2010098389 A1 * | 9/2010 |

OTHER PUBLICATIONS

Search Report is parallel European Application No. 10164321.1 dated Sep. 7, 2010.
German Office Action from German Application No. 10 2009 024 642.8.

* cited by examiner

*Primary Examiner* — Anne Hines
*Assistant Examiner* — Jose M Diaz
(74) *Attorney, Agent, or Firm* — Alson & Bird LLP

(57) ABSTRACT

A display device comprises a support, on which there are arranged LED and a light distributing body above the luminous means with a direction of light emission away from the support and the LED. The light distributing body is a three-dimensional body with a light entrance side facing towards the LED and a light exiting side facing away from the LED. The light distributing body consists of transparent material and the light entrance side is shaped to optimise uniform light distribution from the LED to the light exit side, which may take the form of a diffuser.

20 Claims, 2 Drawing Sheets

DISPLAY DEVICE COMPRISING A THREE-DIMENSIONAL LIGHT DISTRIBUTING BODY

CROSS REFERENCE TO RELATED APPLICATIONS

This application claims priority to German Application Number 10 2009 024 642.8 filed on Jun. 3, 2009, the contents of which are incorporated by reference.

FIELD OF THE INVENTION

The invention relates to a display device with a support, on which at least one luminous means is arranged with light distributor thereabove.

BACKGROUND OF THE INVENTION

It is known from DE 20314391 U, for example, to provide such a display device having LED as luminous means, for achieving a "seven segment display"

In this case, the light distributor comprises a light distributing body which is light-transmitting, but the material of which is selected so as to effect diffuse scattering for uniform light distribution at the light exiting sides of the light distributor or light distributing body.

A further similar display device is known from DE 4311937, in which again a light distributing body is arranged above an LED as a light distributor there above. The LED, in this case, projects into a cuboid-shaped recess in the light distributing body. As an alternative to a roughened surface of the light distributing body for achieving maximum possible light scattering, an attenuating element is applied to the light distributing body, the material of which again improves light scattering and distribution for a uniform light appearance.

The problem underlying the invention is that of providing a display device of the above-mentioned type with improved display effect or luminescent effect while simultaneously minimising structural complexity.

SUMMARY

This problem is solved in one embodiment by a display device having the features as claimed herein. Advantageous and preferred configurations of the invention are the subject matter of the claims and are explained in greater detail below. The wording of the claims is incorporated by express reference into the content of the description.

Provision is made for the light distributor to comprise a three-dimensional light distributing body, which in one embodiment comprises a light entrance side facing towards the luminous means and a light exiting side facing away from the luminous means. According to the invention, the light distributing body consists of transparent material, in particular as transparent or light-transmitting as possible, wherein the light entrance side is of a shape which optimises uniform light distribution from the luminous means to the light exiting side.

In this way, it is ensured that on the one hand as a result of the particular design of the light entrance side, the light from the luminous means is distributed as uniformly as possible to the light exiting side. This makes it possible to achieve a uniform light appearance or luminous effect of the display device. This may be enhanced even more by an optional configuration of the light exiting side as a diffuser, wherein this does not absolutely have to be provided precisely because of the above-mentioned uniform light distribution or may have only a slight effect, such that it does not absorb much light. Furthermore, luminous intensity may be kept high overall as a result of the transparent or advantageously maximally light-transmitting material of the light distributing body, for as readily visible as possible a display device. Thus two functions are optimised.

In another development of the invention, the transmittance for the light from the luminous means in the light distributing body may amount to at least 95%, advantageously even at least 97% to 99%. Moreover, the light distributing body consists particularly advantageously of uncoloured material, in particular a plastics material such as synthetic resin or epoxy resin, polyamide, or polyethylene.

In one embodiment of the invention, the otherwise transparent light distributing body may contain scattering particles for improving light distribution.

In a further embodiment of the invention, the light distributing body may be of one-part and one-piece construction. Advantageously, the entire light distributor is of one-part and one-piece construction and consist merely of the light distributing body. This light distributing body may be fastened directly to the support as a separate part. Alternatively, it may be integrated into a larger plastics block or a plastics housing, advantageously together with further light distributing bodies for further luminous means on the support. Such a housing may be configured, for example, as a whole seven segment display, with seven LEDs being provided therebelow as luminous means.

The lateral outer sides of the light distributing body may be as smooth or highly polished as possible, light from the luminous means which impinges thereon thus being reflected back into the light distributing body and exiting at the light exiting side. In this way, scattering losses may be minimized.

In a further embodiment of the invention, the light entrance side comprises a smooth surface, advantageously as smooth or polished as possible. This also reduces scattering losses and thus light losses in the light distributing body are reduced.

To optimise uniform light distribution, the light entrance side advantageously comprises a double S shape in a side section, wherein the furthest away point of this double S shape lies over the center point of the luminous means or the luminous area thereof. In the central region the light entrance side may thus be concavely curved relative to the light distributing body, this concave curvature inverting towards the sides into a convex curvature. Then, towards the outside, the curvature once again turns back round, resulting in a flat profile or another slight concave curvature.

The maximum height difference between the lowest point and the highest point of the light entrance side may advantageously amount to less than 0.2 mm, particularly advantageously approx. 0.1 mm. Although this appears to be only a small height difference, in the light of the very small sizes of luminous means, which advantageously take the form of LED or Surface Mount Device ("SMD") LED, a perceptible and very advantageous light distribution may in this way be achieved. In principle, however, it is chiefly the shape of the light entrance side which is important, not its absolute dimensions.

In a further embodiment of the invention, the profiling or shaping of the light entrance side with the central concave curvature may be even or rounded. This means therefore that the above-stated shape of the light entrance side, in particular the stated double S shape, is evenly rounded.

In an advantageous further embodiment of the invention, the shaping or profiling of the light entrance side is symmetrical relative to the centre, i.e., so to speak rotationally symmetrical. This centre lies in this case above the centre point of the luminous means or the light-emitting area thereof. If the shape of the light entrance side is different from the fundamental geometric shape of the light exiting side, because, for example, the light entrance side is of roughly round or square construction and the light exiting side is elongate and rectangular, it is possible to deviate from a rotationally symmetrical construction of the light entrance side with regard to profiling or shape. Then it may be more sharply curved towards the longitudinal sides of a longer light exiting side than towards the shorter sides. The transition between the different degrees of profiling in the different directions of the light entrance side should in turn be as smooth as possible.

In a further embodiment of the invention, the light entrance side with its profiling or special shaping should form the majority of the side of the light distributing body which faces towards the luminous means. This should advantageously be at least 80%. Thus, the largest possible proportion of the light emitted by the luminous means is accordingly introduced into the light distributing body.

Advantageously the gradient of the profile of the light entrance side varies less in the outer regions than in an inner region, in particular than in a ring around the central region or over the center point of the luminous means. In this way, it is possible to take account of the relatively large area of the light exiting side illuminated by these regions of smaller area.

The light distributing body should thus be arranged in such a way above the luminous means that the spacing is not too great. Advantageously, the light entrance side may be arranged at most 0.5 mm or even at most just 0.4 mm above the luminous means. High positioning accuracy and precise association of 1 uminous means and light entrance side may thus be achieved.

The width or lateral extent of the light entrance side may likewise amount to a few millimetres, advantageously to at most 3 mm or particularly advantageously even just 2 mm or 1.6 mm. Such small dimensions are then particularly suitable for a SMD LED.

In another embodiment of the invention, the light exiting side may take the form of a diffuser or have a diffuser effect, advantageously through the application of a rather thin diffuser layer or by roughening Micro-roughness may be provided here, with a peak-to-valley height of approx. 3 µm to 10 µm. This diffuser effect should not be all that significant, however, since it necessarily brings about a reduction in light output, which should not occur to too great a degree.

In a further embodiment of the invention, the light exiting side may be of flat or planar construction. Advantageously it extends parallel to the light entrance side or perpendicularly to an axis of symmetry of the light entrance side. Preferably, the light exiting side forms the majority of the side of the light distributing body facing away from the luminous means. Particularly preferably, it amounts to more than 80%, particularly preferably 100%.

These and further features follow not only from the claims but also from the description and the drawings, the individual features being realised in each case alone or several together in the form of sub-combinations in an embodiment of the invention and in other fields and may constitute advantageous, per se protectable embodiments, for which protection is here claimed. Subdivision of the application into individual sections and intermediate headings does not limit the general applicability of the statements made thereunder.

BRIEF DESCRIPTION OF THE DRAWINGS

Exemplary embodiments of the invention are illustrated schematically in the drawings and explained in more detail below. In the drawings.

DETAILED DESCRIPTION

Figure 1:
FIG. 1 shows a plan view onto an illuminated luminous field of a display device.

FIG. 1 shows a luminous field 11 in plan view, such as it is intended to illuminate or produce with a display device according to the invention. Such a luminous field may for example take the form of a type of bar forming part of a conventional seven segment display, for which purpose it is of a basically known shape. The hatching is intended to show that it is very uniformly illuminated, i.e., offers a visually very appealing appearance.

Figure 2:
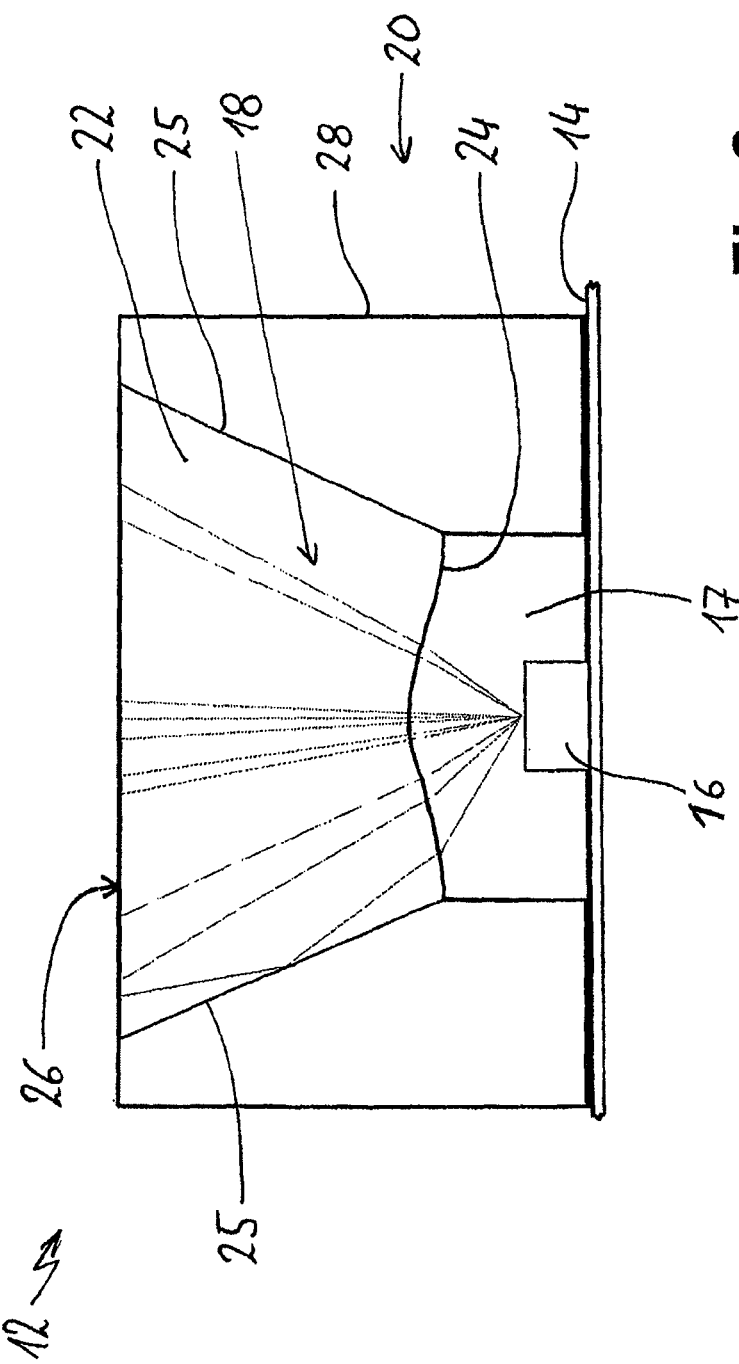
FIG. 2 shows a section through a display device according to the invention with a light distributing body above an LED.

FIG. 2 shows a display device 12 according to one embodiment of the invention in side section. It comprises a support 14, for example a printed circuit board, onto which an SMD LED 16 has been applied as luminous means.

From the light source thereof shown in idealised manner as a punctiform light source located on the top, rays of light 18 extend away in an upwards direction.

Above the LED 16 a plastics body is provided as a light distributor 20, which plastics body comprises a light distributing body 22 consisting of maximally transparent material, in particular with the above-stated transmittance. The light distributing body comprises the specially shaped light entrance side 24 at the bottom facing the LED 16. At the top it comprises a light exiting side 26, which forms the luminous field 11. This means therefore that the light distributing body 22 is rather elongate and narrow.

The light distributing body 22 is contained in a frame component 28, preferably injected moulded therein by multi-component injection moulding or produced together therewith. A space 17 is provided around the LED 16.

The frame component 28 consists of material which does not transmit light. Thus, on the one hand the LED 16 is shielded towards the side, which could cause undesired lighting effects. Furthermore, in the case of light ray 18 shown directly over to the left reflection may thereby be achieved back into the light distributing body 22 and thus emergence at the light exiting side 26 in the intended manner at the luminous field 11.

The side walls 25 of the light distributing body 22 are, as has been explained above, smooth or highly polished. In this way, total reflection may be improved for higher light ray efficiency.

It should be noted with regard to the shape of the light entrance side 24 that this is raised in the centre and then falls away uniformly or symmetrically to both sides. Then the curvature changes again and extends flat or horizontally outwards to its peripheral edge.

Figure 3:
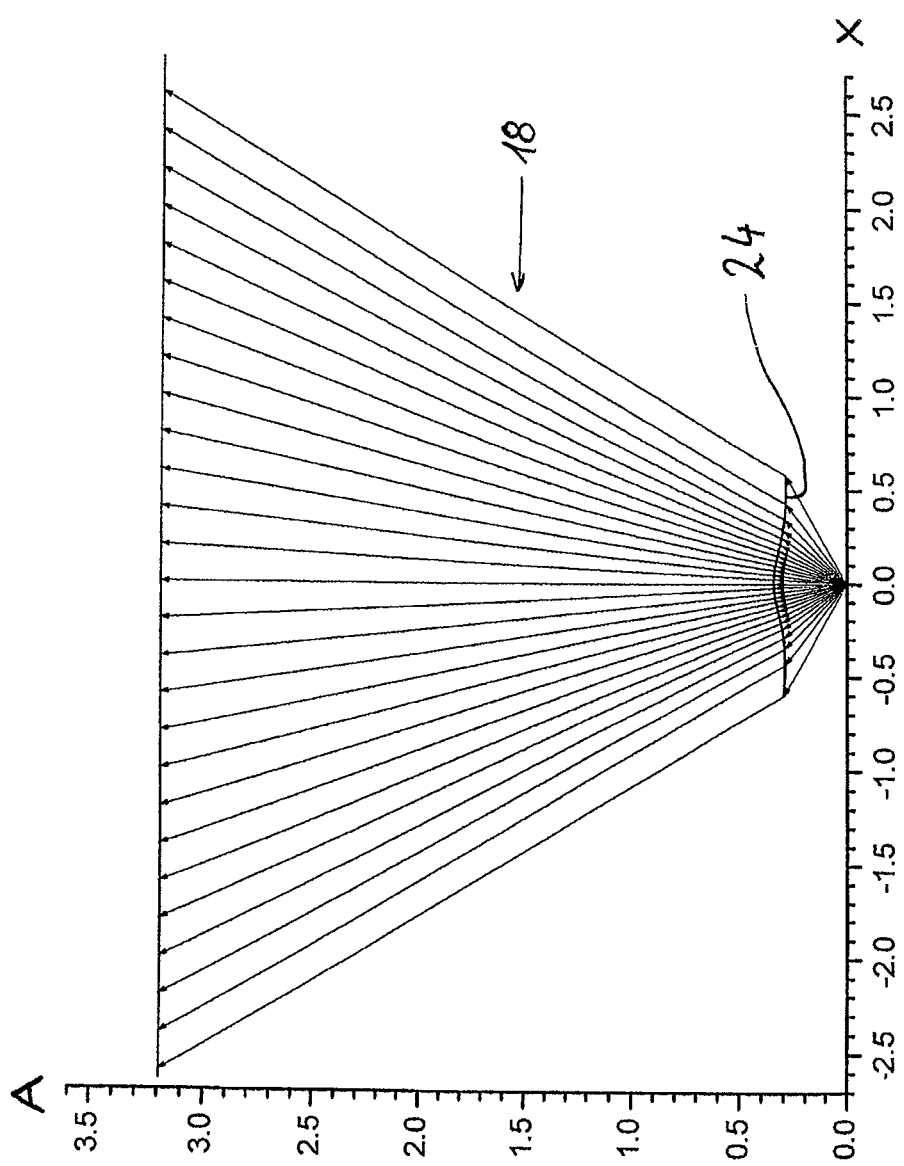
FIG. 3 is a representation of the light distribution at different points of a light entrance side of the light distributing body of FIG. 2 towards the light exiting side with the luminous field.

A more precise representation of the configuration of the light entrance side 24 is shown in FIG. 3. The X-coordinate therein extends in FIG. 2 from left to right in the plane of the drawing. The value "A" on the Y axis denotes the distance between the punctiform light source of the LED 16, in particular at the top thereof, and the light entrance side 24. Both dimensional indications X and A are in mm. It is clear therefrom that for an extension of the light entrance side 24 in the X-direction of approx 1.2 mm the height variations are between 0.1 mm and 0.15 mm. This therefore means extra precision is needed when producing the light entrance side 24 or the entire light distributing body 22, in particular with regard to the injection moulds. This is technically feasible in itself, however. The highest point of the light entrance side 24 is approx. 0.4 mm above the top of the LED.

The shape of the light entrance side 24 may be described mathematically using the following formula, wherein the Y-direction corresponds to the distance A of FIG. 3 and h is the maximum distance of the highest point from the top of the LED:

$$y(x) = h - \frac{\left(\frac{x^2}{R}\right)}{1 + \sqrt{1 - (1+k) \cdot \frac{x^2}{R^2}}} + a_2 \cdot x^2$$

with

| | |
|---|---|
| $h = 1.255$ mm. | i |
| $R = 0.496$ mm. | ii |
| $k = -1.605$. | iii |
| $a_2 = 0.4504$. | iv |

As is clear from the Figures, the luminous field 11, which should ultimately be illuminated as brightly and uniformly as possible, is considerably longer in the X-direction than in a direction of the distance A transverse thereto. In this respect, the configuration of the light entrance side 24 in the direction transverse to the X-direction is provided with a fundamentally similar profile, which however is compressed appropriately to the corresponding width. Since the luminous field is approximately seven times as long as it is wide, this factor of seven also applies roughly to the width of the light entrance side 24 in the direction transverse to the X-direction. This is not a problem, however, and is easy to achieve.

It is easy to conceive, in an embodiment of the invention, of a plurality of such light distributing bodies 22 being integrated into a frame component 28 for a complete seven segment display, said frame component being a single frame component in which the light distributing bodies 22 are inserted or injection moulded in the usual arrangement.

A certain diffuser effect may additionally be provided at the light exiting side 26. This may be achieved by roughening, as described above. Such roughening should not be too severe, however, since too strong a diffuser effect would at the same time bring about too great an attenuation of the light. Alternatively, a layer of conventional diffuser material may be applied, for example with a thickness of 1 µm to 20 µm or even up to 50 µm. Moreover, it should not only be ensured that the light entrance side 24 is precisely shaped when produced, but also that it is arranged at the correct height above the LED 16 and indeed that no sideways displacement occurs. Very precise production and assembly are therefore necessary.

The invention claimed is:

1. A display device comprising:
a support and luminous means arranged on said support, the luminous means comprises a surface mount light emitting diode (LED); and
a light distributor as a separate component that is provided above said luminous means with a direction of light emission away from said support and away from said luminous means, said light distributor comprising a three-dimensional light distributing body with a light entrance side facing towards said luminous means and a light exiting side facing away from said luminous means, wherein said light distributing body comprises a transparent material and said light entrance side is shaped to optimize a uniform light distribution from said luminous means to said light exiting side,
wherein the light distributing body is provided above said surface mount LED,
wherein said light entrance side comprises a double S shape in side section, with its highest point over a centre point of said luminous means or said light-emitting area thereof, and
wherein a maximum height difference between a lowest point and said highest point of said light entrance side amounts to less than 0.2 mm.

2. The display device according to claim 1, wherein said light exiting side comprises a diffuser by machining said light exiting side or a diffuser layer is applied to said light exiting side.

3. The display device according to claim 2, wherein said light exiting side is configured as said diffuser by roughening said light exiting side by machining said light exiting side.

4. The display device according to claim 3, wherein said roughening has a micro-roughness with a peak-to-valley height of 3 µm to 10 µm.

5. The display device according to claim 1, wherein said light distributing body comprises a transmittance for light of said luminous means of at least 95%.

6. The display device according to claim 5, wherein said light distributing body comprises uncoloured material made of plastics.

7. The display device according to claim 1, wherein said transparent light distributing body contains scattering particles for improving light distribution.

8. The display device according to claim 1, wherein said light distributing body is of one-part and one-piece construction, said entire light distributor being of one-part and one-piece construction and consisting of just said light distributing body.

9. The display device according to claim 1, wherein said light entrance side comprises a smooth surface.

10. The display device according to claim 1, wherein said light entrance side comprises a width or lateral extent of at most 3 mm.

11. The display device according to claim 1, wherein said profiling of said light entrance side varies uniformly and is rounded.

12. The display device according to claims 1, wherein said profiling of said light entrance side is symmetrical relative to said center point.

13. The display device according to claim 1, wherein said gradient of said profile of said light entrance side varies less in an outer region than in a ring around said center point.

14. The display device according to claim 1, wherein said light entrance side with said profiling forms a major part of said side of said light distributing body facing towards said luminous means.

15. A display device comprising:
a support and luminous means arranged on said support, the luminous means comprises a surface mount light emitting diode (LED): and
a light distributor as a separate component that is provided above said luminous means with a direction of light emission away from said support and away from said luminous means, said light distributor comprising a three-dimensional light distributing body with a light entrance side facing towards said luminous means and a light exiting side facing away from said luminous means, wherein said light distributing body comprises a transparent material and said light entrance side is shaped to optimize a uniform light distribution from said luminous means to said light exiting side, wherein the light distributing body is provided above said surface mount LED, and wherein said light entrance side is arranged at most 0.5 mm above said luminous means.

16. The display device according to claim 1, wherein said light exiting side is flat.

17. The display device according to claim 16, wherein said light exiting side is perpendicular to an axis of symmetry of said light entrance side.

18. The display device according to claim 1, wherein the light exiting side forms the majority of the side of the light distributing body facing away from the luminous means.

19. The display device according to claim 1, wherein a plurality of luminous means are arranged on said support and one light distributor is provided for each luminous means, a plurality of light distributors being integrally constructed as a component.

20. The display device according to claim 19, wherein said plurality of light distributor is integrally constructed as a component produced together by plastics injection moulding.

* * * * *